United States Patent [19]

McDonald

[11] Patent Number: 5,048,850
[45] Date of Patent: Sep. 17, 1991

[54] WHEELED ARTICLE CARRIER

[76] Inventor: Don C. McDonald, 2604 Barksdale Ct., Clearwater, Fla. 34621

[21] Appl. No.: 583,475

[22] Filed: Sep. 17, 1990

[51] Int. Cl.$^5$ .............................................. B62B 1/14
[52] U.S. Cl. ................................ 280/47.131; 280/79.7
[58] Field of Search ................. 280/47.31, 47.3, 47.32, 280/79.7, 47.26; 180/906; 410/2, 3, 44, 87

[56] References Cited

U.S. PATENT DOCUMENTS

| 291,122 | 1/1884 | Young | 280/47.32 |
|---|---|---|---|
| 569,962 | 10/1896 | Emerson | 280/47.131 X |
| 2,722,428 | 11/1955 | Longbotham | 280/47.131 X |
| 2,816,771 | 12/1957 | Hunt | 280/47.131 |
| 3,090,635 | 5/1963 | Masterson, Jr. | 280/79.7 X |
| 3,717,357 | 2/1973 | Schaefer | 280/47.13 X |
| 3,845,969 | 11/1974 | Nadeau | 280/47.131 X |
| 3,871,054 | 3/1975 | Schaefer | 280/47.131 X |
| 4,695,067 | 9/1987 | Willey | 280/47.131 X |
| 4,853,895 | 8/1989 | Moffitt | 280/47.131 |

FOREIGN PATENT DOCUMENTS

| 619759 | 4/1927 | France | 280/47.131 |
|---|---|---|---|
| 19867 | 12/1890 | United Kingdom | 280/79.7 |

Primary Examiner—Andres Kashnikow
Assistant Examiner—Brian L. Johnson
Attorney, Agent, or Firm—Harold D. Shall

[57] ABSTRACT

A pair of spaced plates connected by a pair of spaced adjusting bolts and an axle shaft. The adjusting bolts and the axle shaft are received within resilient elastomeric tubing which is compressed between the plates. The periphery of the plates opposite the axle is arcuate and is covered by resilient elastomeric material. The adjusting bolts are closer to the plate periphery than is the axle shaft so that a door placed between said plates is supported by resilient elastomeric material without being marred thereby.

1 Claim, 4 Drawing Sheets

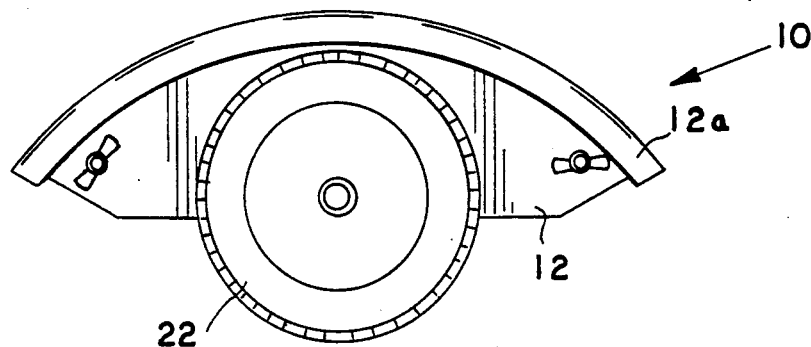
FIG_3
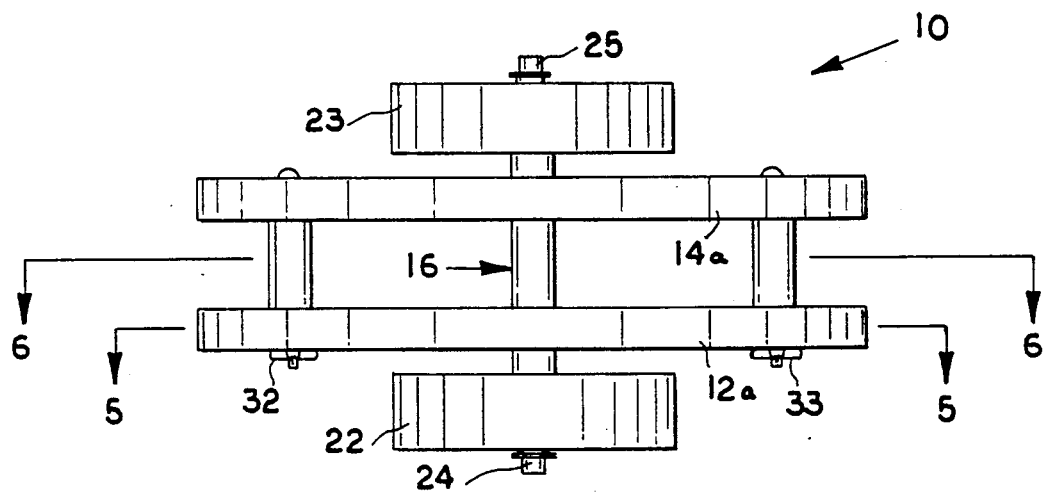
FIG_2
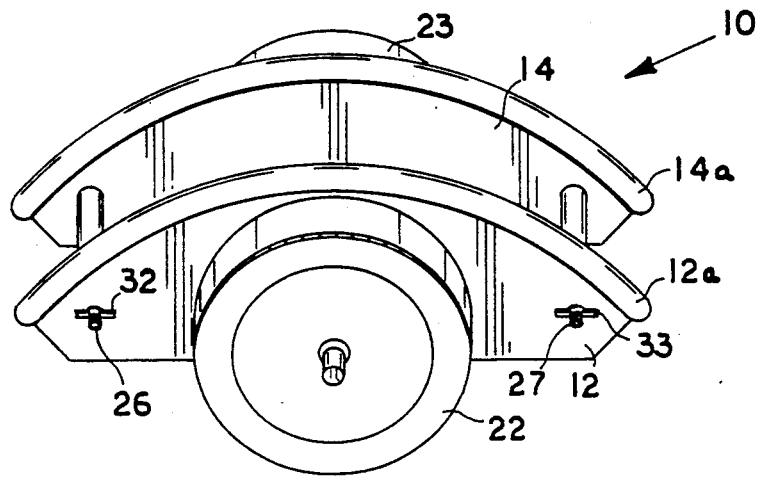
FIG_1

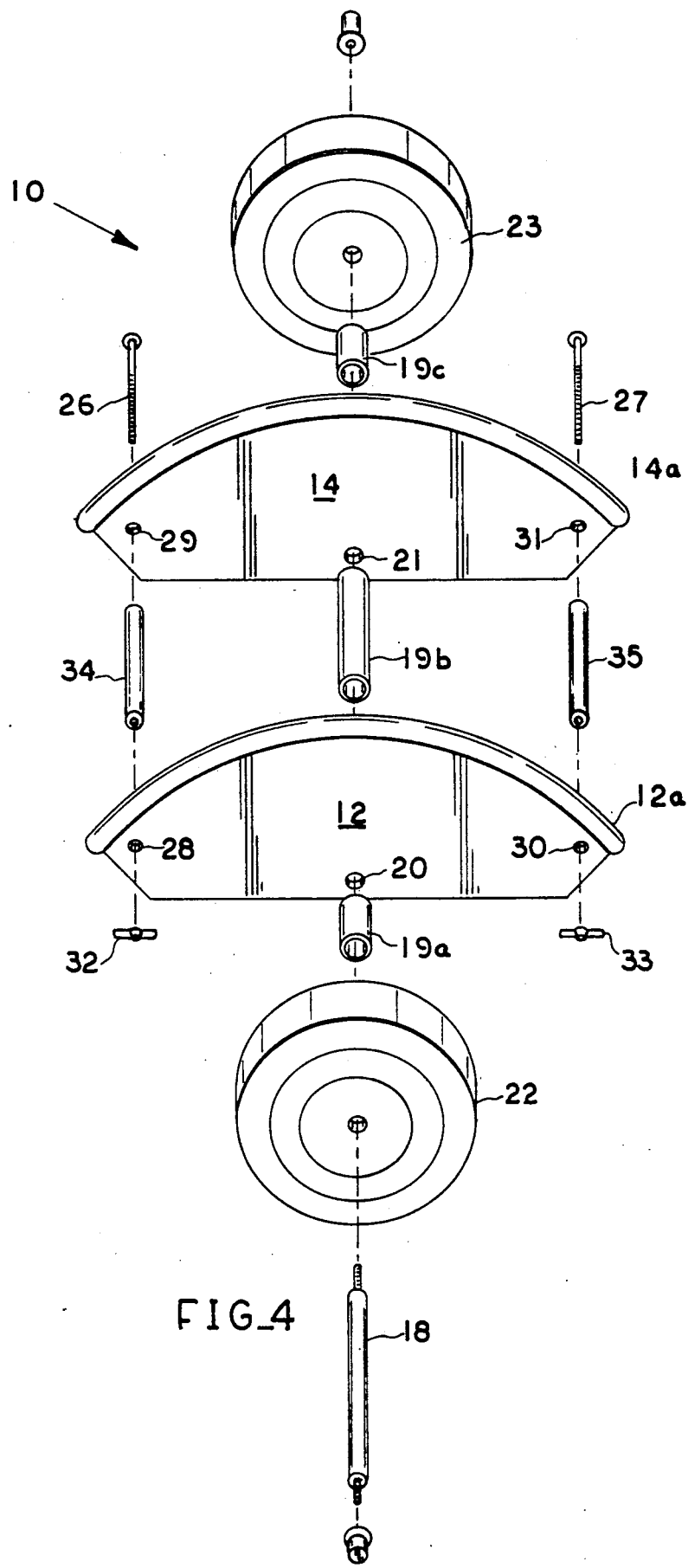
FIG_4

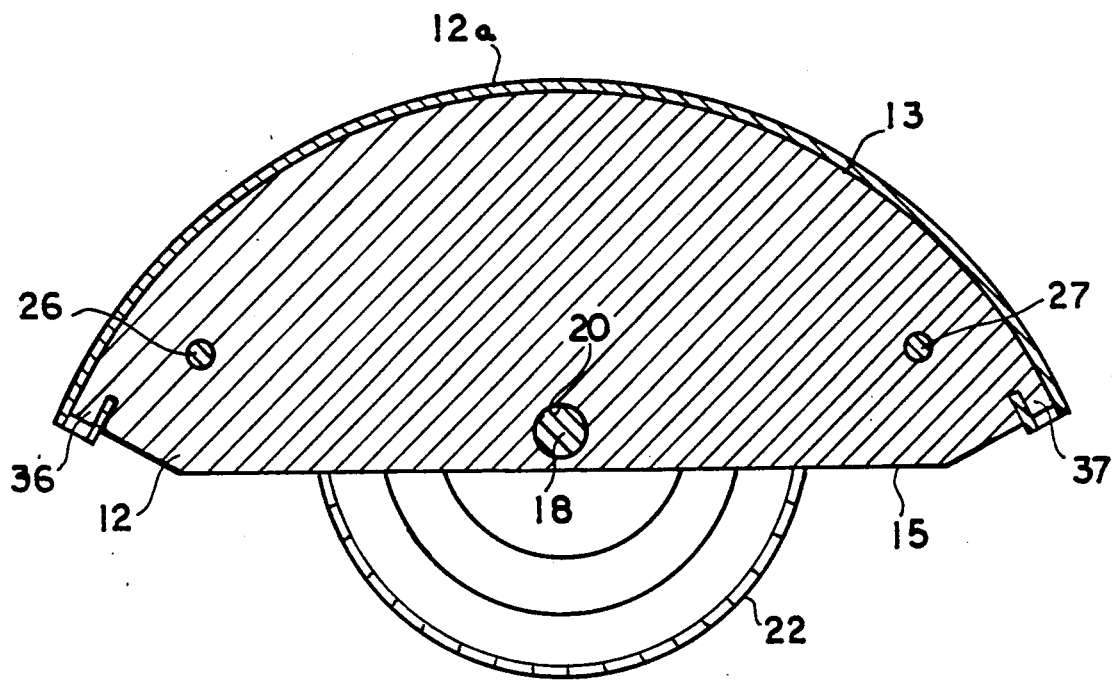
FIG_5

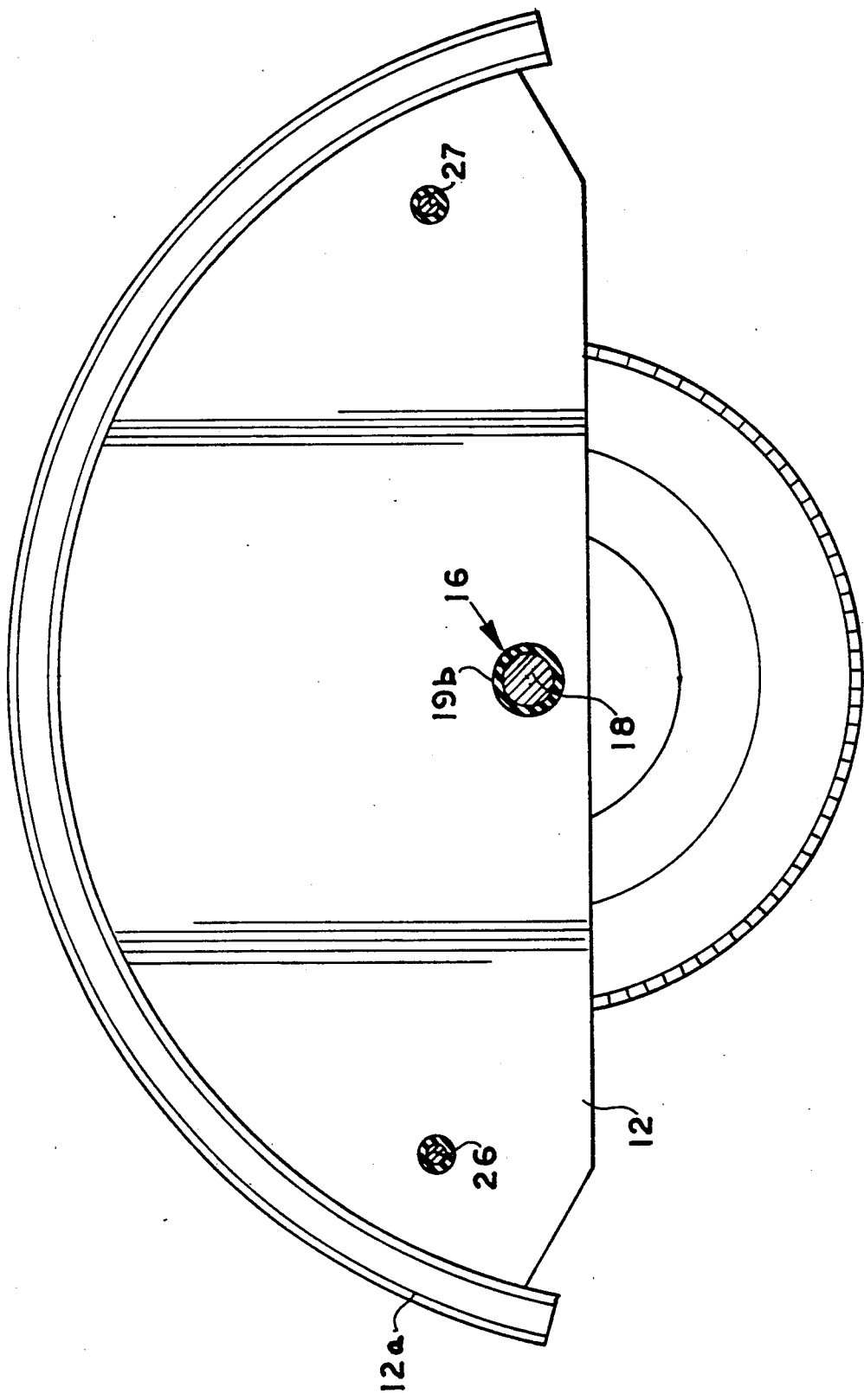
FIG_6

WHEELED ARTICLE CARRIER

FIELD OF THE INVENTION

This invention relates to a wheeled carrier for elongated yet relatively thin articles such as doors, but has applicability to other similarly shaped articles such as plywood and sheet rock.

BACKGROUND OF THE INVENTION

It is often necessary to move relatively large hard to handle objects such as doors from one location to the other at the manufacturing site, the building site or other locations. Other carriers have been used for this purpose but have many drawbacks, one glaring drawback is that the resilient means for supporting the carrier and the clamp adjuster are two separate structures leading to a redundancy of structures. They are also bulky or cumbersome.

It is an object of this invention to provide a carrier where the resilient means for controlling the load on the door also provides the resilient protective support means for the carried object. Another object is to provide such a device which is simple, compact and easily adjustable.

SUMMARY OF THE INVENTION

The instant invention provides a pair of spaced plates joined together by a pair of spaced adjusting bolts and an axle shaft. The adjusting bolts are disposed within elastomeric tubing of a length which is slightly longer than the maximum width at which the plates will be utilized as also is the axle shaft. To adjust the plates to the desired width, the adjusting bolts are tightened until the desired size is reached, during which tightening the elastomeric tubing is axially compressed and keeps the plates firmly pressed against the adjusting bolts and therefore, constantly adjusted. The periphery of the spaced plates which will engage the sides of the door has slit elastomeric tubing pressed over the exposed edges thereof so that the carried article is protected from the plates at the sides thereof. Since the adjusting bolts, the axle and the plate edges are covered with elastomeric material, the door is protected from being marred.

BRIEF DESCRIPTION OF THE DRAWINGS

FIG. 1 is a perspective view of the carrier;
FIG. 2 is a plan view of the carrier;
FIG. 3 is a side elevational view of the carrier;
FIG. 4 is an exploded perspective view of the carrier;
FIG. 5 is view taken along the lines 5—5 in FIG. 2; and
FIG. 6 is a view taken along the lines 6—6 in FIG. 2.

DETAILED DESCRIPTION

Referring now to the drawings, the wheeled carrier is indicated generally by the number 10 and includes a pair of spaced apart side plates 12 and 14 having an arcuate upper periphery 13 and a flat base 15, as seen in FIG. 5. An elastomerically covered axle shaft 16 made up of a metallic rod 18 (see FIGS. 4 and 6) is disposed within three elastomeric tubing sections 19a, 19b and 19c. The elastomeric tubing sections are made of polyvinyl chloride plastic (hereinafter PVC) having a durometer hardness in the general range of 75 to 100 so to be strong and durable yet still retain their resiliency. Adjacent to the flat base at the bottom center of the arcuate side plates 12 and 14 is an axle receiving opening 20 in plate 12 and 21 in plate 14 which receive the metallic rod 18 which rod forms the axle shaft.

Between the plates 12 and 14, the metallic rod 18 is received within the elastomeric PVC tube section 19b with the section 19b being slightly longer then the space between the side plates 12 and 14 to provide a resilient expanding load on the side plates tending to urge them apart.

Adjacent the outer ends of the rod 18 are a pair of internally bushed wheels 22 and 23. Between the wheel 22 and the plate 12 is axially compressed the tubing section 19a and between the wheel 23 and the plate 14 is axially compressed the tubing section 19c while secured to the very end of the lower end (see FIG. 2) of the axle shaft is an end cap 24 and secured to the very end of the upper end of the axle shaft is an end cap 25 which axially secure the wheels 22 and 23 on the axle shaft 18 and axially resiliently compress the tubing sections 19a, 19b and 19c.

Disposed on an arc chord of the side plates 12 and 14 which chord lies closer to the upper periphery of the plates than the axle shaft 16 (see FIGS. 4 and 5) a pair of adjusting and supporting bolts 26 and 27 connect the side plates 12 and 14. More particularly, side plates 12 and 14 are provided with openings 28 and 29 on the left side thereof (see FIG. 4) which receive the bolt 26 and openings 30 and 31 on the right side thereof which receive the bolt 27. The bolts 26 and 27 have, respectively, wingnuts 32, 33 threaded thereon for an adjustable securement thereof. Disposed between the side plates 12 and 14 and receiving, respectively, the bolts 26 and 27 are elastomeric PVC tubes 34 and 35, which tubes are slightly longer than the space between the side plates 12 and 14 when the latter are adjusted to receive a 1¾ inch door for support by the Carrier 10. The side plates 12 and 14 of the Carrier 10 have their arcuate periphery covered with elastomeric PVC tubing 12a and 14a respectively. More particularly, as seen in FIG. 5, the very end of the plate 12 (and likewise the plate 14) are notched at 36 on the left end and 37 on the right end. A section of PVC tubing 12a and 14a the length of a particular section 12 or 14, is slit in the medial portion thereof up to the notches 36 and 37. The slits are then slid over the periphery of the plates 12 and 14 and the very end of the tube 12a or 14a which is not slit is stretched over and then engaged in the notches 36 and 37 to thereby securedly attached the tubing 12a and 12b to the plates 12 and 14 respectively.

In operation, the door is securely received between the tubular sections 12a and 14a which clamps on the sides thereof while the edge of the door rests upon the PVC tubes 34 and 35 which are carried by the supporting and adjusting screws 26 and 27 respectively. The length of the tubes 34 and 35 and of the tube 19b are selected to give a compression fit of a 1¾" door within the tubular sections 12a and 14a. The adjusting wingnuts 32 and 33 can be tightened to reduce the clamping opening down to receive a 1⅜" door.

It is thus seen that the door received in the carrier 10 is entirely protected and can be wheeled on the axle 16. The PVC tubes 34 and 35 not only protects the door but also provide a resilient load on the side plates 12 and 14. Although the above description relates to a preferred embodiment, modification can be made therein without departing from the spirit of the invention as defined in the following claims.

What is claimed is:

1. A wheeled article carrier comprising in combination, a pair of spaced side plates each having an arcuate periphery and a base, resilient elastomeric material carried by said arcuate periphery, an axle shaft carried by said plates adjacent the base thereof, a pair of wheels on said axle shaft, a pair of adjusting and supporting bolts extending laterally between and carried by said side plates and disposed at a location intermediate said arcuate periphery and said axle shaft, an adjusting nut carried by each of said bolts, a resilient elastomeric tube received by each of said bolts with the axial ends of said tube being compressed by said plates, a resilient elastomeric tube carried by said axle shaft and disposed and compressed between said side plates, the elastomeric material carried by said arcuate periphery has a longitudinal slit therein receiving said arcuate periphery, which slit terminates short of the ends of said material, said side plates have notches formed therein at the ends of said arcuate periphery, and said unslit ends of said resilient material on said arcuate portion is received and secured in said slits.

* * * * *